UNITED STATES PATENT OFFICE.

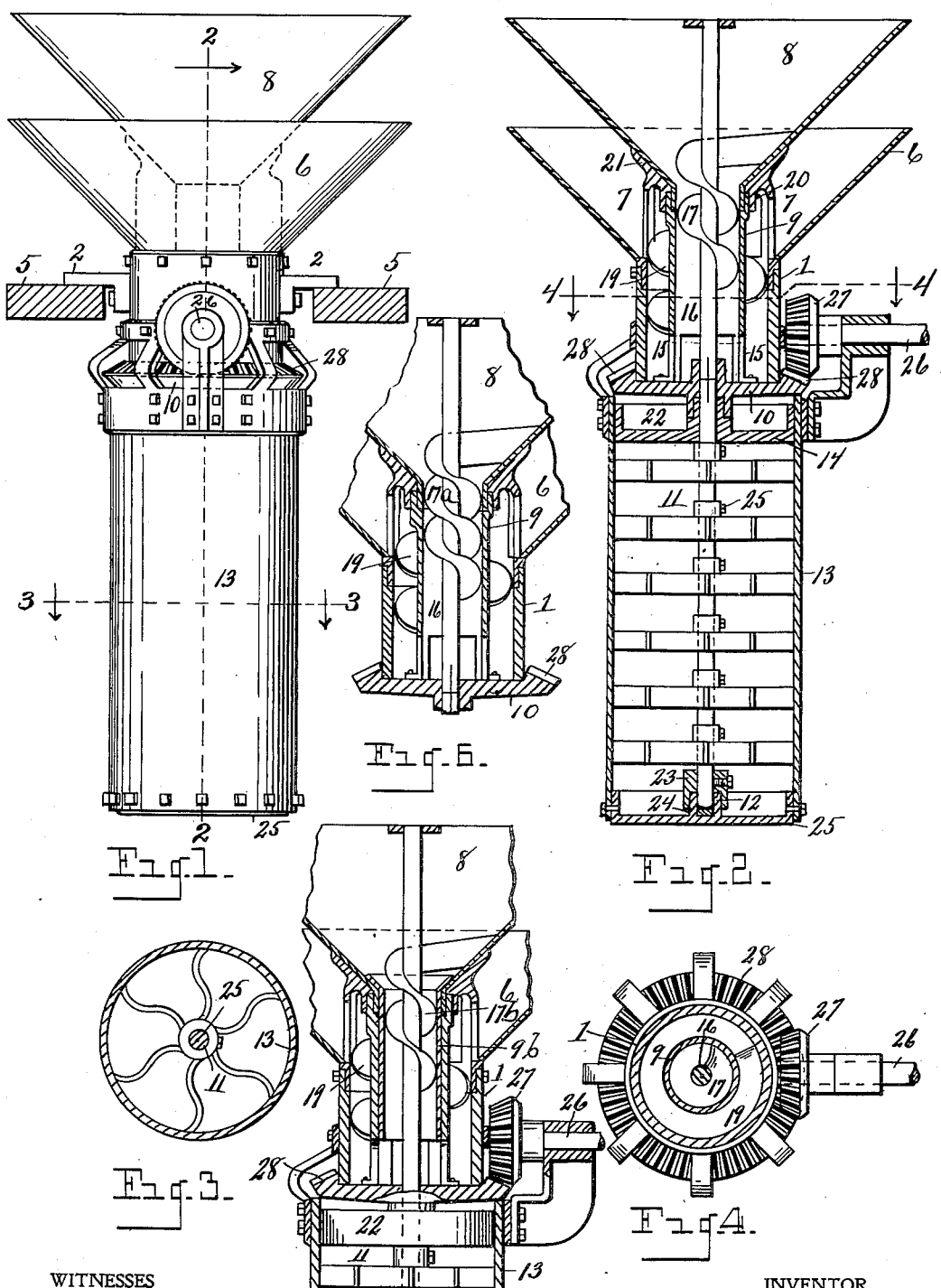

DAVID M. PICKETT, OF DETROIT, MICHIGAN, ASSIGNOR, BY DIRECT AND MESNE ASSIGNMENTS, OF THREE-FOURTHS TO CHARLES F. BURTON, OF DETROIT, MICHIGAN.

FEED-REGULATOR FOR POWDERED MATERIAL.

No. 914,973.  Specification of Letters Patent.  Patented March 9, 1909.

Application filed July 23, 1906. Serial No. 327,276.

*To all whom it may concern:*

Be it known that I, DAVID M. PICKETT, a citizen of the United States, residing at Detroit, county of Wayne, State of Michigan, have invented a certain new and useful Improvement in Feed-Regulators for Powdered Material, and declare the following to be a full, clear, and exact description of the same, such as will enable others skilled in the art to which it pertains to make and use the same, reference being had to the accompanying drawings, which form a part of this specification.

This invention relates to feed regulators for powdered material, especially feed regulators for the materials of concrete; it has for its object an improved regulator adapted to proportion and mix the material of which concrete is made.

In the drawings:—Figure 1, is an elevation. Fig. 2, is a sectional elevation. Fig. 3, is a section at the line 3—3. Fig. 4, is a section at the line 4—4. Fig. 5, shows the inner conduit with a sleeve inserted therein. Fig. 6, shows the inner conduit with a screw of different pitch from that shown in Fig. 2.

A cylindrical body part 1, supported by brackets 2, that rests on suitable frame timbers 5, supports directly a hopper 6, in which sand is thrown, or sand and gravel are thrown. At the top of the cylindrical body 1, inside the hopper, rise struts 7 that support a second hopper 8, in which the cement part of the concrete is thrown.

The main or body part 1, constitutes the outlet conduit for the hopper 6; within this outlet conduit and spaced from it is a second conduit which constitutes the outlet for the hopper 8. The inner conduit is supported from a wheel 10 on a vertical shaft 11, which revolves in bearings, of which the lower bearing 12 is carried at the center of a spider supported at the lower end of a hanging case 13 which is secured to the lower end of said casing 1. The upper end of the shaft 11 which carries mixing blades revolves in bearings through a spider 14 that spans the upper end of the mixer case 13. The conduit 9 is supported by struts 15, which are spaced to furnish an outlet to the conduit which discharges through the openings between the struts and also through openings between spokes on the wheel 10. The conduit 9 carries on its outer surface a screw that revolves in the chamber between the conduit 9 and the conduit 1.

From the center of the wheel 10 rises a screw shaft 18, that carries the screw 17 which revolves with the conduit 9, and which acts as a force speed screw for the hopper 8. The shaft 1, is splined or otherwise secured to the shaft 11 so that the latter is rotated thereby. The two screws 17 and 19 are proportioned to force through their respective conduits the material from the hoppers 6 and 8, in some definite proportion, and these proportions may be changed by changing the rate of feed of either the outer conduit or the inner conduit. The inner conduit may be more readily and easily changed than the outer conduit, and this may be done by replacing the screw 17 with another screw, either of different pitch (as screw $17^a$ shown in Fig. 6) or a screw $17^b$ of smaller diameter, and in this latter case, filling in the space left between the screw of smaller diameter and the walls of the conduit 9 with a sleeve $9^b$, thus decreasing the cross area of the conduit to correspond with the decreased cross area of the screw.

The upper end of the conduit 9 engages in a groove 20 made in the casting 21, at the mouth of the hopper 8; this furnishes a steady bearing for the upper end of the conduit, the walls of the groove form a housing over the end of the conduit and keep it practically clear or clean of dust and dirt. The wheel 10 is furnished on its lower side with a cup-like hub 22 that engages over a hub-like projection on the spider 14, and the lower end of the shaft 12 is also provided with a cup shaped housing 23, that engages over a hub-like projection 24 on the lower spider 25. The hanging shaft 11 is provided with a number of projecting arms extending from a hub 25, which serves to mix the material in its passage through the hanging case 13. The revolving parts of the mixer are driven by a main driving shaft 26 provided with a miter pinion 27 that meshes with miter gear 28, on the wheel 10. The hanging case 31 hangs from the case 1, by means of yoke arms 28.

What I claim is:—

1. In a feed regulator for powdered materials, the combination of a plurality of hoppers, a conduit for each hopper, the several conduits being in concentric arrangement, and a conveyer screw appurtenant to each conduit, extending thereacross to the opposite face of the next adjacent conduit wall, whereby the proportions of material passing therethrough may be positively regulated, substantially as described.

2. In combination with hoppers adapted to contain materials to be mixed, conduits from said hoppers in concentric arrangement, a rotatable feed regulating device in each of said conduits, a wheel supporting said feed devices and provided with openings through which the material may fall, substantially as described.

3. In combination with a plurality of hoppers, an outlet from each hopper, a screw conveyer engaging in each outlet, the said outlets being arranged one within another whereby there is formed a central outlet passage from one of said hoppers, and an annular outlet passage from another of said hoppers with a screw conveyer engaging in said central passage, and a hollow screw engaging in said annular passage, substantially as described.

4. In combination with a plurality of hoppers, an outlet from each hopper, the outlet from one of said hoppers being located within the outlet from another of said hoppers, whereby there is formed a central passage from the first hopper, and an annular passage from the second hopper, struts supporting the conduit of the first mentioned outlet and forming passages communicating between the central passage and the annular passage, substantially as described.

5. In combination with hoppers adapted to contain segregated masses of material, a conduit leading from each, said hoppers and conduits being coaxially arranged, and having a common point of delivery, a screw feed regulator in each of said conduits, each positively controlling by its extent to the wall of the next adjacent conduit the possible flow of material therethrough, and a unitary rotating device on which all of said feed regulators are mounted, substantially as described.

In testimony whereof, I sign this specification in the presence of two witnesses.

DAVID M. PICKETT.

Witnesses:
   MAY E. KOTT,
   C. C. JENNINGS.